J. H. Williams,
Potato Washer,
Nº 56,652. Patented July 24, 1866

Witnesses: Inventor:

UNITED STATES PATENT OFFICE.

JOSHUA H. WILLIAMS, OF EAST CRAFTSBURY, VERMONT.

IMPROVED POTATO-WASHER.

Specification forming part of Letters Patent No. 56,652, dated July 24, 1866.

*To all whom it may concern:*

Be it known that I, JOSHUA H. WILLIAMS, of East Craftsbury, Orleans county, State of Vermont, have invented a new and useful Improvement in Potato-Washers; and I do hereby declare that the following is a full, clear, and exact description thereof, which will enable others skilled in the art to make and use the same, reference being had to the accompanying drawings, forming part of this specification, in which—

Figure 1:
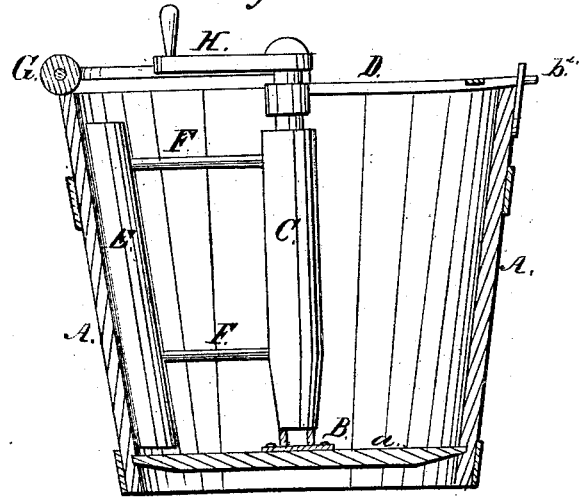
Figure 2:
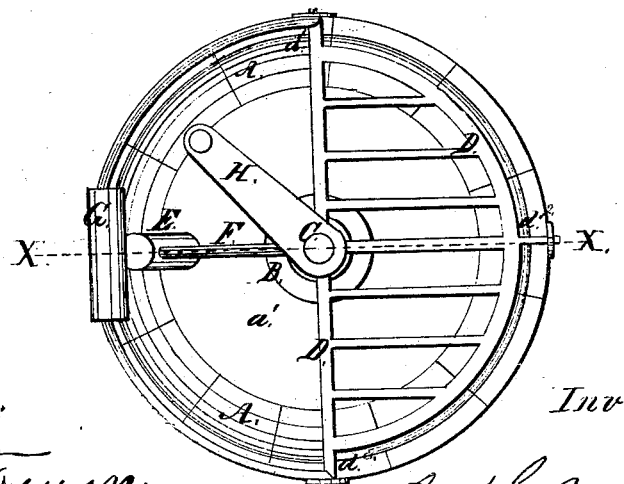

Figure 1 is a vertical central section of my improved potato-washer, taken through the line $x\,x$, Fig. 2. Fig. 2 is a top or plan view of the same.

Similar letters of reference indicate like parts.

My invention has for its object to furnish an improved machine by means of which potatoes may be quickly and thoroughly washed; and it consists, first, of the combination of a revolving shaft with the pail or tub; and, second, in the combination of a grate with the pail or tub, and with the revolving shaft, as hereinafter more fully described.

A is the pail or tub in which the washing is to be done. This may be an ordinary wooden pail or any other suitable vessel.

To the center of the bottom $a'$ is attached a socket, B, in which the foot of the revolving shaft C revolves. The upper end of this shaft revolves in bearings in the grate D, as shown in the drawings.

E is the sweep, which is attached to the shaft C by cross-bars F, and which is placed in such a position as to sweep around the inner surface of the pail or vessel A, thoroughly stirring the potatoes through the water and washing all the dirt from them.

The grate D is placed upon the top of the pail A, and covers about one-half of the said top, as shown in Fig. 1. This grate D is provided with projecting arms $d'\,d^2\,d^3$, which pass through holes formed in ears attached to the upper edges of the pail or vessel A, as shown in Figs. 1 and 2.

The ends of the arms $d'$ and $d^3$ may pass through holes formed in the ears to which the bail or handle G is attached.

To the upper end of the shaft C is attached a crank, H, by means of which the washer is operated.

In using the apparatus the potatoes are placed in the vessel with enough water to cover them; then by turning the crank H the potatoes are stirred rapidly through the water by the revolution of the sweep E, and all the dirt washed from them. The water is then poured off through the grate D, which keeps the potatoes from escaping, after which the potatoes may be poured out without its having been necessary for the operator to wet her or his hands during the operation.

I claim as new and desire to secure by Letters Patent—

The combination of the grate D with the pail A, revolving shaft C, and sweep E, constructed and arranged in the manner and for the purpose herein specified.

JOSHUA H. WILLIAMS.

Witnesses:
A. P. DUTTON,
M. E. DUTTON.